United States Patent
Furukawa et al.

(10) Patent No.: US 9,638,545 B2
(45) Date of Patent: May 2, 2017

(54) POWER MANAGEMENT APPARATUS, POWER MANAGEMENT SYSTEM AND POWER MANAGEMENT METHOD

(71) Applicant: KYOCERA CORPORATION, Kyoto (JP)

(72) Inventors: Takashi Furukawa, Kawasaki (JP); Ryuta Fujisawa, Kawasaki (JP); Ryutaro Mayumi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 70 days.

(21) Appl. No.: 14/401,231

(22) PCT Filed: May 16, 2013

(86) PCT No.: PCT/JP2013/063720
§ 371 (c)(1),
(2) Date: Nov. 14, 2014

(87) PCT Pub. No.: WO2013/172431
PCT Pub. Date: Nov. 21, 2013

(65) Prior Publication Data
US 2015/0160040 A1    Jun. 11, 2015

(30) Foreign Application Priority Data
May 16, 2012  (JP) .................. 2012-112907
May 29, 2012  (JP) .................. 2012-122552

(51) Int. Cl.
*G08B 19/00* (2006.01)
*G08B 21/00* (2006.01)
(Continued)

(52) U.S. Cl.
CPC ............... *G01D 4/002* (2013.01); *H02J 3/00* (2013.01); *H02J 13/0086* (2013.01);
(Continued)

(58) Field of Classification Search
CPC ...................................... G01D 4/002
(Continued)

(56) References Cited

U.S. PATENT DOCUMENTS

| 2009/0234511 | A1* | 9/2009 | Ouchi | H02J 3/14 700/291 |
| 2011/0106321 | A1* | 5/2011 | Cherian | H02J 3/00 700/286 |

(Continued)

FOREIGN PATENT DOCUMENTS

| JP | S56-022536 A | 3/1981 |
| JP | H10-198875 A | 7/1998 |

(Continued)

OTHER PUBLICATIONS

International Search Report; PCT/JP2013/063720; Jul. 2, 2013.
Office Action dated Aug. 11, 2015, issued in counterpart Japanese application No. 2012-112907.

*Primary Examiner* — Santiago Garcia
(74) *Attorney, Agent, or Firm* — Procopio Cory Hargreaves and Savitch LLP

(57) ABSTRACT

In the present invention, a power monitoring unit (330) estimates the integral power consumption on the basis of an obtained actual value or amount of change of power consumption. When the estimated value for the integral power consumption as estimated by the power monitoring unit (330) reaches a prescribed amount of power, a presentation unit (204) presents a warning, on the basis of the power values obtained by a load power meter (340), indicating a list of loads for which the power consumption should be controlled.

12 Claims, 13 Drawing Sheets

(51) Int. Cl.
  *G01D 4/00* (2006.01)
  *H02J 13/00* (2006.01)
  *H02J 3/00* (2006.01)

(52) U.S. Cl.
  CPC ... *H02J 2003/001* (2013.01); *H02J 2003/003* (2013.01); *Y02B 70/343* (2013.01); *Y02B 90/241* (2013.01); *Y02B 90/245* (2013.01); *Y04S 10/525* (2013.01); *Y04S 10/54* (2013.01); *Y04S 20/32* (2013.01); *Y04S 20/34* (2013.01); *Y04S 20/40* (2013.01)

(58) Field of Classification Search
  USPC .................................................. 340/870.09
  See application file for complete search history.

(56) References Cited

U.S. PATENT DOCUMENTS

| | | | | |
|---|---|---|---|---|
| 2011/0115295 | A1* | 5/2011 | Moon | H02J 3/32 307/65 |
| 2011/0130982 | A1* | 6/2011 | Haag | G01R 22/063 702/62 |
| 2011/0133558 | A1* | 6/2011 | Park | H02J 3/32 307/66 |
| 2012/0004783 | A1* | 1/2012 | Lo | H02J 3/14 700/291 |
| 2012/0029897 | A1* | 2/2012 | Cherian | H02J 3/00 703/18 |
| 2012/0080949 | A1* | 4/2012 | Gelonese | H02J 3/14 307/31 |
| 2012/0093537 | A1* | 4/2012 | Eguchi | G03G 15/0283 399/88 |
| 2012/0191262 | A1* | 7/2012 | Marcus | G06Q 30/0202 700/286 |
| 2012/0323510 | A1* | 12/2012 | Bell | H02J 3/14 702/62 |
| 2013/0009607 | A1* | 1/2013 | Nishibayashi | B60L 11/1844 320/162 |
| 2013/0046495 | A1* | 2/2013 | Sim | G01R 31/3658 702/63 |
| 2013/0047010 | A1* | 2/2013 | Massey | G06Q 10/06 713/320 |
| 2013/0073105 | A1* | 3/2013 | Schmid | H02J 3/382 700/295 |
| 2013/0268196 | A1* | 10/2013 | Dam | G01W 1/00 702/3 |
| 2013/0325190 | A1* | 12/2013 | Imes | G05D 23/1919 700/276 |
| 2014/0207296 | A1* | 7/2014 | Kjær | F03D 7/0264 700/287 |
| 2014/0358315 | A1* | 12/2014 | Liu | H02J 13/00 700/297 |

FOREIGN PATENT DOCUMENTS

| | | |
|---|---|---|
| JP | H11-069625 A | 3/1999 |
| JP | 2000-184590 A | 6/2000 |
| JP | 2004-129322 A | 4/2004 |
| JP | 2008-011618 A | 1/2008 |
| JP | 2008-236913 A | 10/2008 |

* cited by examiner

| ORDER | LOAD | POWER CONSUMPTION |
|---|---|---|
| 1 | FACILITY 1 | 25 kW |
| 2 | LIGHTING 1 | 20 kW |
| 3 | FACILITY 2 | 18 kW |
| 4 | LIGHTING 2 | 16 kW |
| 5 | AIR CONDITIONER 1 | 12 kW |
|  | TOTAL | 237 kW |

| ORDER | LOAD | POWER CONSUMPTION | VARIATION AMOUNT |
|---|---|---|---|
| 1 | AIR CONDITIONER 1 | 12 kW | 99% |
| 2 | AIR CONDITIONER 3 | 10 kW | 99% |
| 3 | FACILITY 2 | 18 kW | 44% |
| 4 | AIR CONDITIONER 2 | 8 kW | 25% |
| 5 | FACILITY 3 | 25 kW | 15% |
| | TOTAL | 237 kW | 11% |

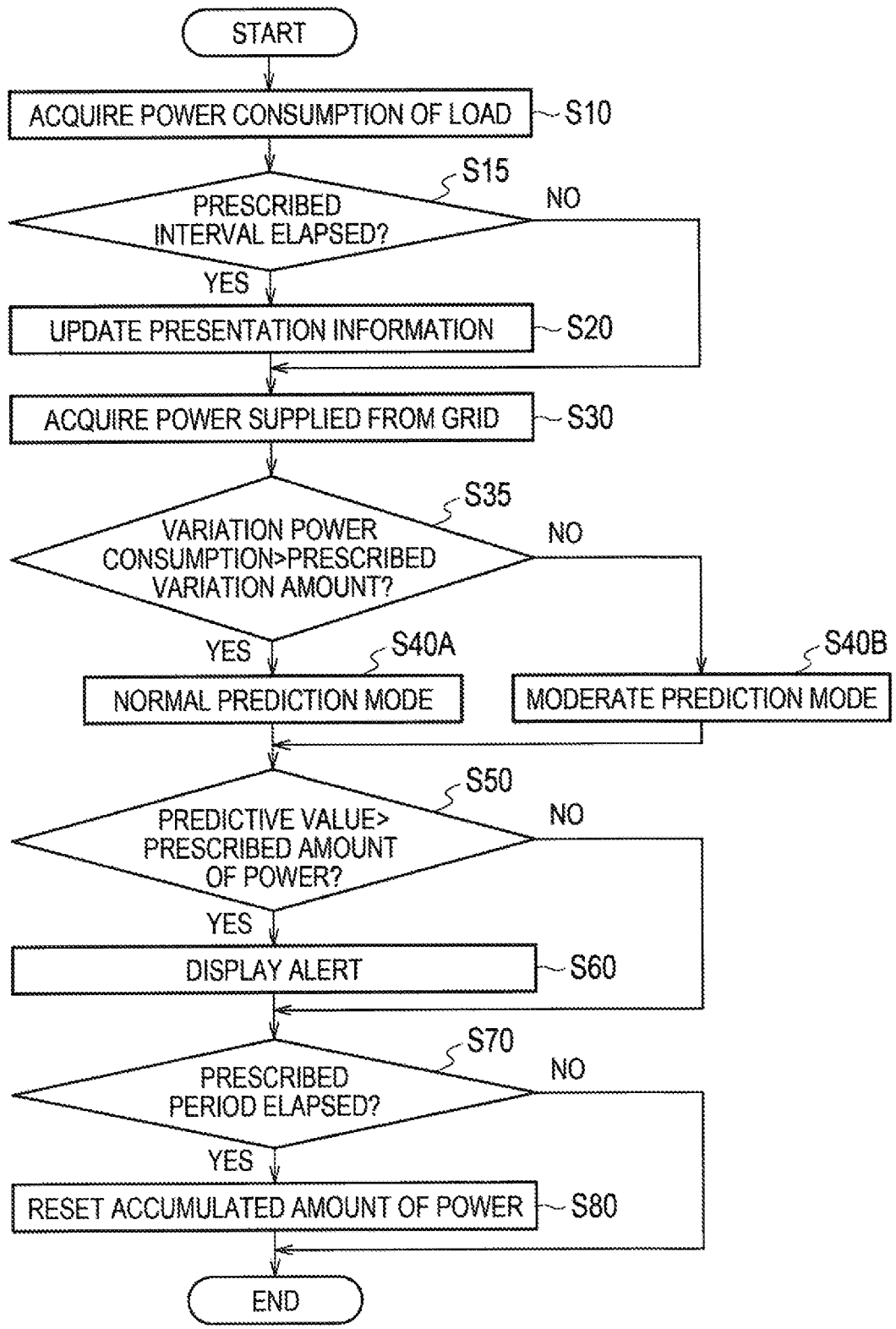

POWER MANAGEMENT APPARATUS, POWER MANAGEMENT SYSTEM AND POWER MANAGEMENT METHOD

TECHNICAL FIELD

The present invention relates to a power management apparatus, a power management system and a power management method for monitor an accumulated amount of power supplied from a grid in a prescribed period so as not to exceed a prescribed amount of power.

BACKGROUND ART

Recently, people are becoming increasingly conscious of environmental consideration and techniques to reduce power consumption of load are proposed (for example, Patent Literature 1).

Then, techniques to present, to a user, an alert notifying that power consumption to be reduced so that the accumulated amount of power supplied from the grid in a prescribed period does not exceed the prescribed amount of power. In particular, the accumulated amount of power at the time of expiration of the prescribed period is predicted based on an increment in the amount of power supplied from the grid per unit time (hereafter, referred to as an increment per unit time) and, if the predicted accumulated amount of power exceeds a prescribed amount of power, an alert notifying that the power consumption to be reduced is presented to a user (for example, Patent Literature 2).

CITATION LIST

Patent Literature

[Patent Literature 1] Japanese Patent Application Laid-open No. 2008-236913
[Patent Literature 2] Japanese Patent Application Laid-open No. 10-198875

SUMMARY OF INVENTION

In the techniques described above, an accumulated amount of power at the time of expiration of a prescribed period is predicted based on a difference in the accumulated amount of power at two timings (i.e., an increment per unit time). Therefore, when a variation in the increment per unit time is large, a state in which an alert is presented (i.e., an alert ON state) and a state in which an alert is turned off (i.e., an alert OFF state) will be repeated.

Then, the present invention has been made to solve the above-described problems and an object thereof is to provide a power management apparatus, a power management system and a power management method capable of reducing repetition of an alert ON state and an alert OFF state.

A power management apparatus according to a first feature issues an alert to a user so that an accumulated amount of power supplied from a grid in a prescribed period does not exceed a prescribed amount of power. The power management apparatus includes: a first power acquisition unit which acquires power supplied from the grid; a second power acquisition unit which acquires power consumed by a load connected to the grid; a prediction unit which predicts the accumulated amount of power based on an actual value or an variation amount of the power acquired by the first power acquisition unit; and a presentation unit which issues an alert that indicates a list of loads in which power consumption to be reduced based on an amount of power acquired by the second power acquisition unit when the predictive value of the accumulated amount of power predicted by the prediction unit reaches the prescribed amount of power.

In the first feature, the prescribed period includes a first period and a second period after the first period; and the presentation unit presents the alert in the first period when the predictive value of the accumulated amount of power predicted by the first prediction unit reaches the prescribed amount of power, and presents the alert in the second period when the predictive value of the accumulated amount of power predicted by the second prediction unit reaches the prescribed amount of power.

In the first feature, the presentation unit presents the alert in a first form when the predictive value of the accumulated amount of power predicted by the first prediction unit reaches the prescribed amount of power, and presents the alert in a second form which is different from the first form when the predictive value of the accumulated amount of power predicted by the second prediction unit reaches the prescribed amount of power.

In the first feature, the first form is a form in which a list of loads is presented in a descending order of the actual values of power acquired by the second power acquisition unit.

In the first feature, the second form is a form in which a list of loads is presented in a descending order of the variation amount of the power acquired by the second power acquisition unit.

In the first feature, the power management apparatus predicts an accumulated amount of power supplied from the grid in the prescribed period.

In the first feature, the power management apparatus according to claim 6, includes: a third prediction unit which acquires, as sample values, an amount of power acquired by the first power acquisition unit and predict the accumulated amount of power based on the acquired sample values, and the third prediction unit changes the number of the sample values, or intervals at which the sample values are acquired.

In the first feature, the third prediction unit changes the number of the sample values, or the intervals at which the sample values are acquired based on a kind of the load connected to the grid.

In the first feature, the third prediction unit changes the number of the sample values, or the intervals at which the sample values are acquired based on a variation of the power acquired by the second power acquisition unit.

In the first feature, the third prediction unit predicts the accumulated amount of power, using three or more sample values as the sample values, and the third prediction unit specifies a slope which indicates a change in the accumulated amount of power based on the least-squares method or the moving average method.

A power management system according to a second feature is provided with a power management apparatus and a load connected to a grid. The power management apparatus includes: a first power acquisition unit which acquires power supplied from the grid; a second power acquisition unit which acquires power consumed by a load connected to the grid; a prediction unit which predicts the accumulated amount of power based on an actual value or an variation amount of the power acquired by the first power acquisition unit; and a presentation unit which presents an alert that indicates a list of loads in which power consumption to be reduced based on an amount of power acquired by the second power acquisition unit when the predictive value of the accumulated amount of power predicted by the prediction unit reaches the prescribed amount of power.

A power management method according to a third feature presents an alert to a user so that an accumulated amount of power supplied from a grid in a prescribed period does not exceed a prescribed amount of power. The power management method includes: a step A of acquiring power supplied from the grid; a step B of acquiring power consumed by the load connected to the grid; a step C of predicting the accumulated amount of power based on an actual value of power acquired in the step A; a step D of predicting the accumulated amount of power based on an variation amount of the power acquired in the step A; and a step E of presenting an alert that indicates a list of loads in which power consumption to be reduced based on the amount of power acquired in the step B when the predictive value of the accumulated amount of power predicted in the step C or the step D reaches the prescribed amount of power.

According to the present invention, it is possible to provide a power management apparatus, a power management system and a power management method capable of letting a user effectively know a load in which power consumption to be reduced while reducing confusion of the user.

BRIEF DESCRIPTION OF DRAWINGS

FIG. 15 is a flowchart illustrating a power management method according to Modification 1.

DESCRIPTION OF THE EMBODIMENTS

Figure 1:
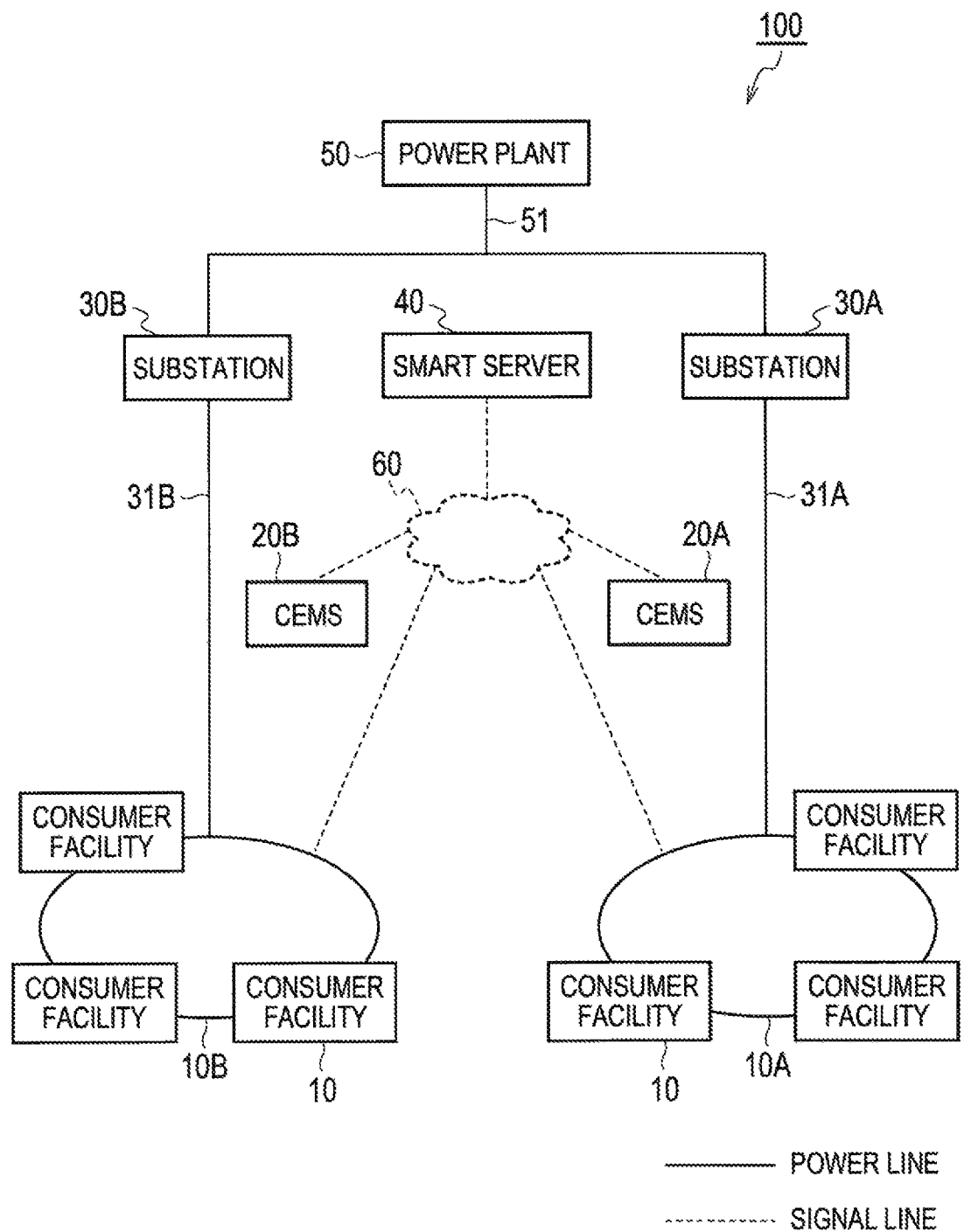
FIG. 1 is a diagram illustrating an energy management system 100 according to a first embodiment.

Hereinafter, a power management apparatus and an alert presenting method according to an embodiment of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

Outline of Embodiments

A power management apparatus according to some embodiments issues an alert to a user so that an accumulated amount of power supplied from a grid in a prescribed period does not exceed a prescribed amount of power. The power management apparatus includes: a first power acquisition unit which acquires power supplied from the grid; a second power acquisition unit which acquires power consumed by a load connected to the grid; a prediction unit which predicts the accumulated amount of power based on an actual value or an variation amount of the power acquired by the first power acquisition unit; and a presentation unit which issues an alert that indicates a list of loads in which power consumption to be reduced based on an amount of power acquired by the second power acquisition unit when the predictive value of the accumulated amount of power predicted by the prediction unit reaches the prescribed amount of power.

In an embodiment, the power management apparatus issues the alert notifying the list of loads of which power consumption to be reduced based on the amount of power acquired by the second power acquisition unit when the accumulated amount of power predicted based on the actual value or the variation amount of the power acquired by the first power acquisition unit reaches the prescribed amount of power. This reduces repetition of an alert ON state and an alert OFF state.

First Embodiment

Energy Management System

Hereinafter, an energy management system according to a first embodiment will be described. FIG. 1 is a diagram illustrating an energy management system 100 according to the first embodiment.

As illustrated in FIG. 1, the energy management system 100 is provided with a consumer facility 10, a CEMS 20, a substation 30, a smart server 40 and a power plant 50. The consumer facility 10, the CEMS 20, the substation 30 and the smart server 40 are connected via a network 60.

The consumer facility 10 is provided with, for example, a power generating apparatus and a power storage apparatus. The power generating apparatus is, for example, an apparatus which outputs power using fuel gas like a fuel cell. The power storage apparatus is, for example, an apparatus which stores power like a secondary battery.

The consumer facility 10 is a store such as a convenience store or a supermarket. The consumer facility 10 may be a residence such as a detached house, housing complex such as a condominium, a commercial institution such as a building, or a factory.

In the first embodiment, a consumer facility group 10A and a consumer facility group 10B are constituted by a plurality of consumer facilities 10. The consumer facility group 10A and the consumer facility group 10B are classified according to, for example, geographical areas.

The CEMS 20 controls interconnection between a plurality of consumer facilities 10 and a power system. Note that the CEMS 20 may be referred to as CEMS (Cluster/Community Energy Management System) because the CEMS 20 manages a plurality of consumer facilities 10. In particular, the CEMS 20 disconnects a plurality of consumer facilities 10 from the power system at the time of, for example, a power failure. On the other hand, the CEMS 20 performs interconnection between a plurality of consumer facilities 10 and the power system at the time of, for example, power return.

In the first embodiment, a CEMS 20A and a CEMS 20B are provided. The CEMS 20A controls, for example, interconnection between the consumer facilities 10 included in the consumer facility group 10A and the power system. The CEMS 20B controls, for example, interconnection between the consumer facilities 10 included in the consumer facility group 10B and the power system.

The substation 30 supplies a plurality of consumer facilities 10 with power via a distribution line 31. In particular, the substation 30 lowers a voltage supplied from the power plant 50.

In the first embodiment, a substation 30A and a substation 30B are provided. The substation 30A supplies power to, for example, the consumer facilities 10 included in the consumer facility group 10A via a distribution line 31A. The substation 30B supplies power to, for example, the consumer facilities 10 included in the consumer facility group 10B via a distribution line 31B.

The smart server 40 manages a plurality of CEMS 20 (here, the CEMS 20A and the CEMS 20B). Further, the smart server 40 manages a plurality of substations 30 (here, the substation 30A and the substation 30B). In other words, the smart server 40 collectively manages consumer facilities 10 included in the consumer facility group 10A and the consumer facility group 10B. The smart server 40 has, for example, a function to balance the power to be supplied to the consumer facility group 10A and the power to be supplied to the consumer facility group 10B.

The power plant 50 generates power by fire power, wind power, hydraulic power, atomic power and the like. The power plant 50 supplies a plurality of substations 30 (here, the substation 30A and the substation 30B) with power via a power line 51.

The network 60 is connected to each apparatus via a signal line. The network 60 is, for example, the Internet, a broadband communication network, a narrowband communication network, a portable telephone network, and the like.

(Consumer Facility)

Figure 2:
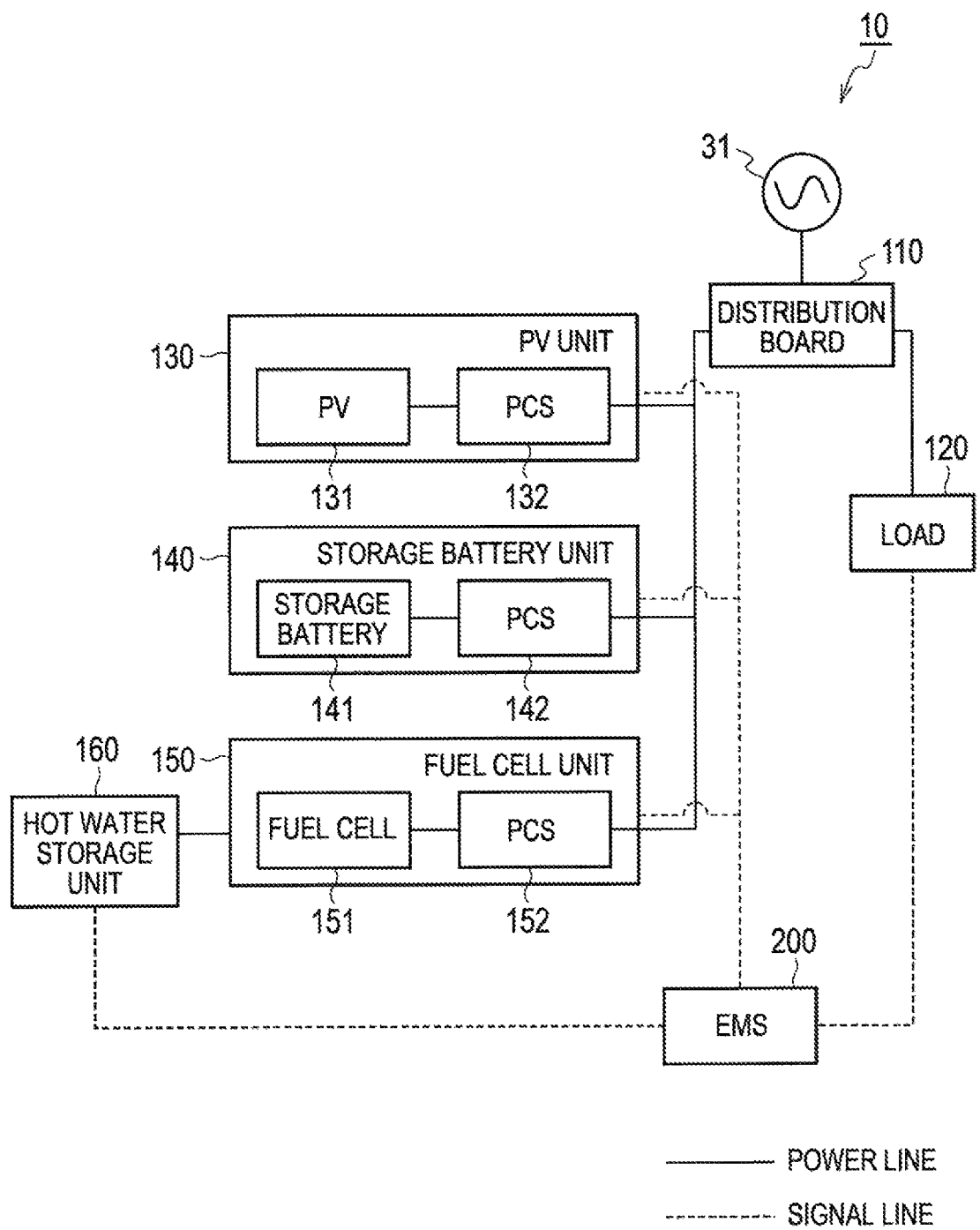
FIG. 2 is a diagram illustrating a consumer facility 10 according to the first embodiment.

Hereinafter, the consumer facility according to the first embodiment will be described. FIG. 2 is a diagram illustrating details of the consumer facility 10 according to the first embodiment.

As illustrated in FIG. 2, the consumer facility 10 is provided with a distribution board 110, a load 120, a PV unit 130, a storage battery unit 140, a fuel cell unit 150, a hot water storage unit 160 and the EMS 200.

The distribution board 110 is connected to the distribution line 31 (i.e., the grid). The distribution board 110 is connected to the load 120, the PV unit 130, the storage battery unit 140 and the fuel cell unit 150 via a power line.

The load 120 is an apparatus which consumes power supplied via the power line. For example, the load 120 includes an apparatus, such as a refrigerator, a freezer, a lighting apparatus or an air conditioner.

The PV unit 130 is provided with a PV 131 and a PCS 132. The PV 131 is an exemplary power generating apparatus, and is a photovoltaic power generating apparatus which generates power upon reception of sunlight. The PV 131 outputs generated DC power. An amount of generated power of the PV 131 changes depending on an amount of solar radiation with which the PV 131 is irradiated. The PCS 132 is an apparatus which converts DC power output from the PV 131 into AC power (i.e., a Power Conditioning System). The PCS 132 outputs the AC power to the distribution board 110 via the power line.

In the first embodiment, the PV unit 130 may be provided with a pyranometer for measuring the amount of solar radiation with which the PV 131 is irradiated.

The PV unit 130 is controlled by the MPPT (Maximum Power Point Tracking) method. In detail, the PV unit 130 optimizes an operating point of the PV 131 (i.e., a point defined by an operating point voltage value and the power value, or a point defined by the operating point voltage value and a current value).

The storage battery unit 140 is provided with a storage battery 141 and a PCS 142. The storage battery 141 is an apparatus which stores power. The PCS 142 is an apparatus (i.e., a Power Conditioning System) which converts AC power supplied from the distribution line 31 (i.e., the grid) into DC power. Further, the PCS 142 converts the DC power output from the storage battery 141 into AC power.

The fuel cell unit 150 is provided with a fuel cell 151 and a PCS 152. The fuel cell 151 is an exemplary power generating apparatus, and is an apparatus which outputs power using fuel gas. The fuel cell 151 is, for example, SOFC (Solid Oxide Fuel Cell) or PEFC (Polymer Electrolyte Fuel Cell). The PCS 152 is an apparatus (i.e., a Power Conditioning System) which converts DC power output from the fuel cell 151 into AC power.

The fuel cell unit 150 is operated by load following control. In detail, the fuel cell unit 150 controls the fuel cell 151 so that power output from the fuel cell 151 becomes the target power of the load following control.

The hot water storage unit 160 is an exemplary heat storage apparatus which converts power into heat, stores heat, or stores heat generated by a cogeneration apparatus, such as the fuel cell unit 150, as hot water. In particular, the hot water storage unit 160 is provided with a hot water storage tank and heats water supplied from the hot water storage tank with exhaust heat produced by operation (i.e., power generation) of the fuel cell 151. In detail, the hot water storage unit 160 heats water supplied from the hot water storage tank and flows back the heated hot water to the hot water storage tank.

The EMS 200 is an apparatus (i.e., an Energy Management System) which controls the PV unit 130, the storage battery unit 140, the fuel cell unit 150 and the hot water storage unit 160. In particular, the EMS 200 is connected to the PV unit 130, the storage battery unit 140, the fuel cell unit 150 and the hot water storage unit 160 via a signal line and controls the PV unit 130, the storage battery unit 140, the fuel cell unit 150 and the hot water storage unit 160. Further, the EMS 200 controls power consumption of the load 120 by controlling an operation mode of the load 120.

Further, the EMS 200 is connected to various servers via network 60. Various servers store information including, for example, a purchase unit price of the power supplied from the grid, a sales unit price of the power supplied from the grid and a purchase unit price of the fuel gas (hereafter, referred to as energy rate information).

Alternatively, various servers store information used for, for example, predicting power consumption of the load 120 (hereafter, referred to as energy consumption prediction information). The energy consumption prediction information may be, for example, generated based on a past actual value of power consumption of the load 120. Alternatively, the energy consumption prediction information may be a model of power consumption of the load 120.

Alternatively, various servers store, for example, information used for predicting the amount of generated power of the PV 131 (hereafter, referred to as prediction information about the amount of generated PV power). The PV power generation prediction information may be a predictive value of the amount of solar radiation with which the PV 131 is irradiated. Alternatively, the PV power generation prediction information may be weather report, season, daylight hours and the like.

(Applicative Scene)

Figure 3:
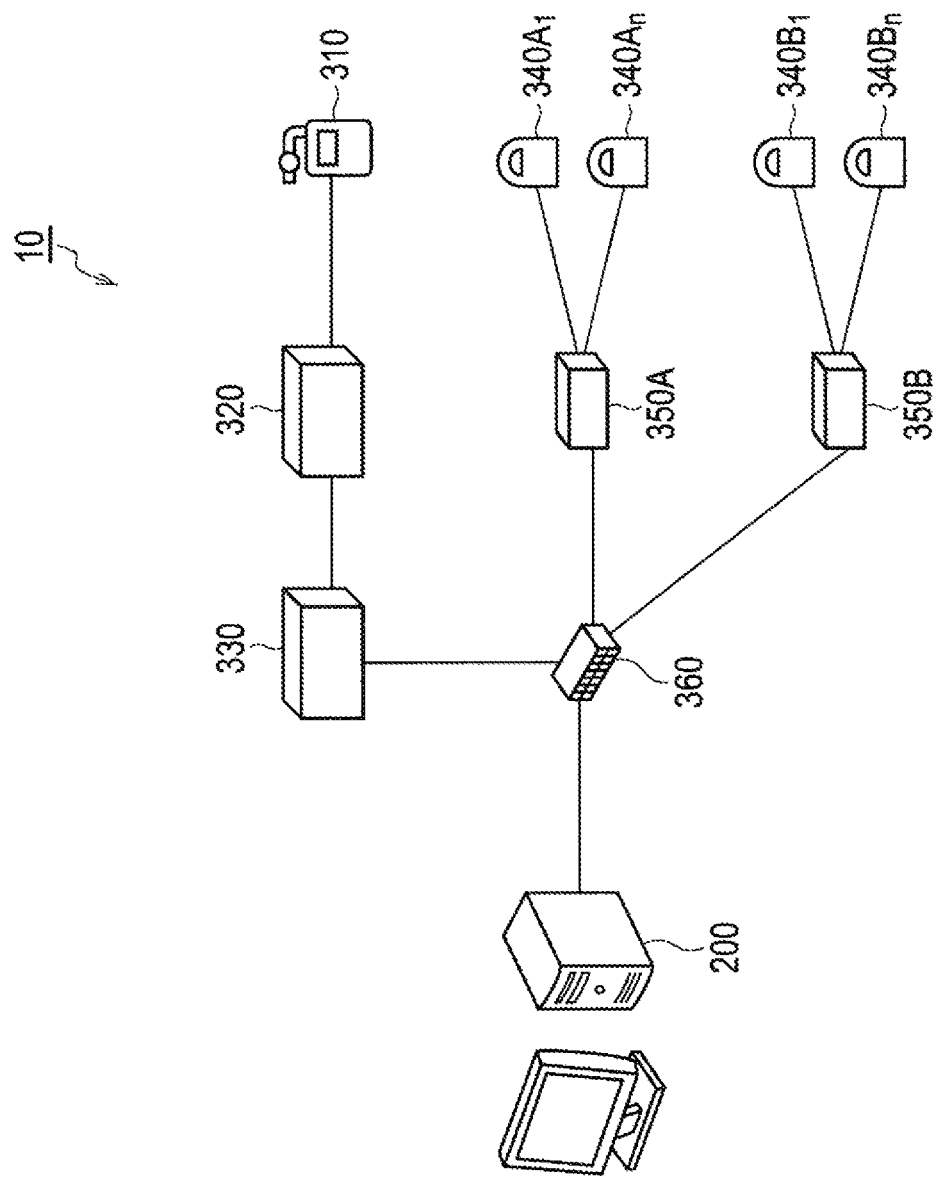
FIG. 3 is a diagram for describing an applicative scene of the first embodiment.

Hereinafter, an applicative scene of the first embodiment will be described. FIG. 3 is a diagram for describing an applicative scene of the first embodiment. FIG. 3 mainly describes an information flow in the consumer facility 10.

As illustrated in FIG. 3, the consumer facility 10 is provided with a grid power meter 310, a power measurement unit 320, a power monitoring unit 330, a load power meter 340, a smart sensor 350 and a hub 360. As described above, the consumer facility 10 is provided with the EMS 200.

The grid power meter 310 measures power supplied from the distribution line 31 (i.e., the grid). In particular, the grid power meter 310 is disposed further toward the distribution line 31 (i.e., the grid) than the distribution board 110, and measures the power supplied to the entire consumer facility 10.

The power measurement unit 320 accumulates the power measured by the grid power meter 310 in the prescribed period. In other words, the power measurement unit 320 accumulates the power measured by the grid power meter 310 from the start of the prescribed period to the expiration of the prescribed period. That is, the power measurement unit 320 resets the accumulated value (i.e., the accumulated amount of power) in each prescribed period.

In Japan, for example, the total power rate of a high-voltage power user is defined by a basic rate and a metered power rate. The basic rate is defined based on the accumulated amount of power supplied from the grid in the past demand period (i.e., a peak amount of power). Therefore, it is desirable to control power consumption of each load so that the accumulated amount of power in a demand period does not exceed the prescribed amount of power. Then, the demand period (for example, 30 minutes) may be defined as the prescribed period.

The power monitoring unit 330 acquires the integrated value (i.e., the accumulated amount of power) acquired from the power measurement unit 320 as a sample value and, based on the sample value, monitors whether a predictive value of the accumulated amount of power at the time of expiration of the prescribed period exceeds the prescribed amount of power. In particular, the power monitoring unit 330 acquires, as a sample value, an amount of power measured by the grid power meter 310 and predicts the accumulated amount of power based on the actual value of the acquired sample value. Alternatively, the power monitoring unit 330 acquires, as a sample value, an amount of power measured by the grid power meter 310 and predicts the accumulated amount of power based on a variation amount of the acquired sample value. That is, in the first embodiment, the power monitoring unit 330 configures the first power acquisition unit. In the first embodiment, the power monitoring unit 330 configures the prediction unit provided with the first prediction unit and the second prediction unit.

Here, it is desirable that, in a first half (i.e., a first period) of the prescribed period, the power monitoring unit 330 acquires, as a sample value, the amount of power measured by the grid power meter 310 and predicts the accumulated amount of power based on the actual value of the acquired sample value. It is desirable that, in a second half (i.e., a second period) of the prescribed period, the power monitoring unit 330 to acquires, as a sample value, the amount of power measured by the grid power meter 310 and predicts the accumulated amount of power based on the variation amount of the acquired sample value.

For example, the first half of the prescribed period is a period from the start of the prescribed period to the ½ of the prescribed period, and the second half of the prescribed period is a period from the ½ of the prescribed period to the expiration of the prescribed period. Alternatively, the first half of the prescribed period is a period from the start of the prescribed period to the ⅔ of the prescribed period, and the second half of the prescribed period is the period from the ⅔ of the prescribed period to the expiration of the prescribed period. The timing at which the first half and the second half are divided may be defined at any timing within the prescribed period.

In the first embodiment, the power monitoring unit 330 changes the number of sample values used for the prediction of the accumulated amount of power at the time of expiration of the prescribed period. Alternatively, the power monitoring unit 330 changes intervals at which the sample values used for prediction of the accumulated amount of power at the time of expiration of the prescribed period are acquired.

In detail, the power monitoring unit 330 changes the number of sample values or the intervals at which the sample values are acquired based on the kind of load connected to the grid. In particular, when it is determined that the variation of the power consumption of the load connected to the grid is greater than a prescribed variation amount based on the kind of the load connected to the grid, the power monitoring unit 330 increases the number of sample values. For example, when a ratio of the load of which variation amount of the power consumption exceeds the prescribed amount among the loads connected to the grid is greater than a prescribed ratio, the power monitoring unit 330 increases the number of sample values. When an average value or a variance value of the variation amount of the power consumption of the load connected to the grid is greater than a prescribed ratio, the power monitoring unit 330 may increase the number of sample values. Alternatively, when it is determined that the variation of the power consumption of the load connected to the grid is greater than the prescribed variation amount based on the kind of the load connected to the grid, the power monitoring unit 330 increases the intervals at which the sample values are acquired. For example, when a ratio of the load of which variation amount of the power consumption exceeds the prescribed amount among the loads connected to the grid is greater than a prescribed ratio, the power monitoring unit 330 increases the intervals at which the sample values are acquired. When an average value or a variance value of the variation amount of the power consumption of the load connected to the grid is greater than a prescribed ratio, the power monitoring unit 330 may increase the intervals at which the sample values are acquired.

Alternatively, the power monitoring unit 330 uses, as sample values, three or more sample values to predict the accumulated amount of power at the time of expiration of the prescribed period. The power monitoring unit 330 specifies a slope which indicates a change in the accumulated amount of power based on the least-squares method or the moving average method. For example, when the variation of the power consumption of the load connected to the grid is smaller than the prescribed variation amount, the power monitoring unit 330 specifies the slope which indicates a change in the accumulated amount of power by the least-squares method using three sample values. On the other hand, when the variation of the power consumption of the load connected to the grid is greater than the prescribed variation amount, the power monitoring unit 330 specifies the slope which indicates the change in the accumulated amount of power by the least-squares method using five sample values.

When the predictive value of the accumulated amount of power at the time of expiration of the prescribed period exceeds the prescribed amount of power, the power monitoring unit 330 transmits, to the EMS 200, information which indicates that the predictive value of the accumulated amount of power exceeds the prescribed amount of power.

The load power meter 340 is provided at each load 120 and measures power consumed at each load 120. In the first embodiment, as the load power meter 340, second power meters 340A1 to 340An and second power meters 340B1 to 340Bn are provided. The first power meters 340A1 to 340An are connected to a power line A provided under the control of a breaker A of the distribution board 110, and the second power meters 340B1 to 340Bn are connected to a power line B provided under control of a breaker B of the distribution board 110. In the first embodiment, the load power meter 340 configures the second power acquisition unit.

The smart sensor 350 collects power measured by the load power meter 340 provided under the control of the smart sensor 350. In the first embodiment, a smart sensor 350A and a smart sensor 350B are provided as the smart sensor 350. The smart sensor 350A collects power measured by the first power meters 340A1 to 340An. The smart sensor 350B collects power measured by the second power meters 340B1 to 340Bn.

The smart sensor 350 transmits, to the EMS 200, information which indicates power measured by each load power meter 340 together with an identifier of each load power meter 340. Alternatively, the smart sensor 350 transmits, to the EMS 200, information which indicates a total value of power measured by the load power meter 340.

The hub 360 is connected to the EMS 200, the power monitoring unit 330 and the smart sensor 350 via a signal line. The hub 360 relays information output from the power monitoring unit 330 and the smart sensor 350 to the EMS 200.

(Configuration of EMS)

Figure 4:
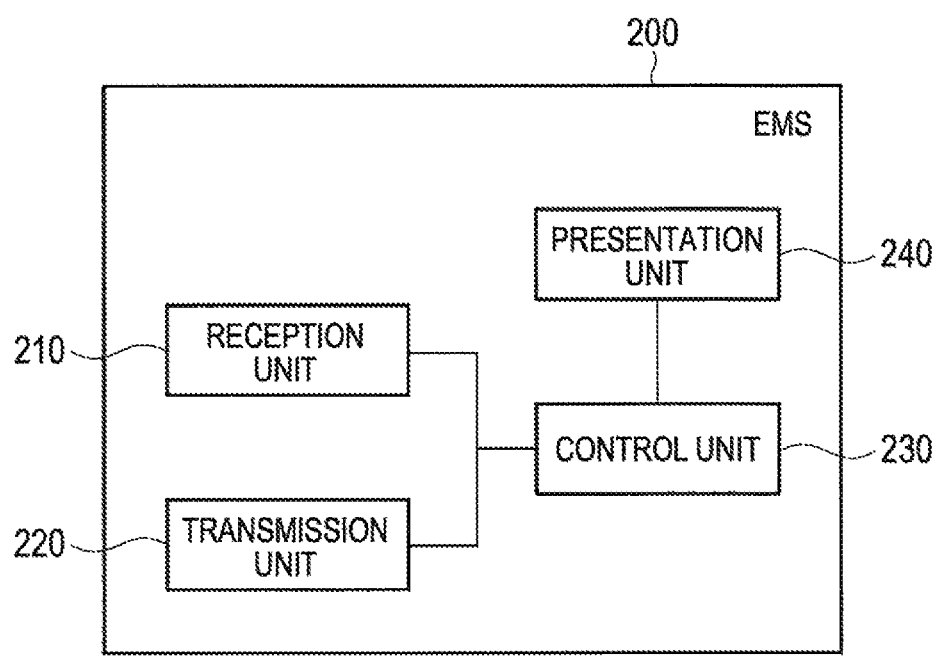
FIG. 4 is a diagram illustrating an EMS 200 according to the first embodiment.

Hereinafter, the EMS of the first embodiment will be described. FIG. 4 is a block diagram illustrating the EMS 200 of the first embodiment.

As illustrated in FIG. 4, the EMS 200 is provided with a reception unit 210, a transmission unit 220, a control unit 230 and a presentation unit 240.

The reception unit 210 receives various signals from the apparatuses connected via the signal line. For example, the reception unit 210 receives, from the power monitoring unit 330, information which indicates that the predictive value of the accumulated amount of power exceeds the prescribed amount of power. The reception unit 210 receives, from the smart sensor 350, information which indicates power measured by each load power meter 340 together with an identifier of each load power meter 340. Alternatively, the reception unit 210 may receive, from the smart sensor 350, information which indicates power totaled by the smart sensor 350.

In the first embodiment, the reception unit 210 may receive, from the PV unit 130, information which indicates the amount of generated power of the PV 131. The reception unit 210 may receive, from the storage battery unit 140, information which indicates an amount of stored power of the storage battery 141. The reception unit 210 may receive, from the fuel cell unit 150, information which indicates an amount of generated power of the fuel cell 151. The reception unit 210 may receive, from the hot water storage unit 160, information which indicates an amount of stored hot water of the hot water storage unit 160.

In the first embodiment, the reception unit 210 may receive, from various servers, the energy rate information, the energy consumption prediction information and the prediction information about the amount of generated PV power via the network 60. However, the energy rate information, the energy consumption prediction information and the prediction information about the amount of generated PV power may be stored in the EMS 200 in advance.

The transmission unit 220 transmits various signals to the apparatuses connected via the signal line. For example, the transmission unit 220 transmits signals used to control the PV unit 130, the storage battery unit 140, the fuel cell unit 150 and the hot water storage unit 160 to each unit using a communication protocol, such as the ECHONET Lite or the ZigBee (registered trademark). The transmission unit 220 transmits, to the load 120, a control signal for controlling the load 120 using a communication protocol, such as the ECHONET Lite.

The control unit 230 controls the load 120, the PV unit 130, the storage battery unit 140, the fuel cell unit 150 and the hot water storage unit 160.

In the first embodiment, the control unit 230 generates a list of loads including power consumption of the load. The list of loads may be a list presented constantly or may be a list presented when the predictive value of the accumulated amount of power exceeds the prescribed amount of power.

In particular, the control unit 230 generates a list of loads based on the power measured by each load power meter 340. The list of loads at least includes, for example, the name of the load and power consumption of the load. The list of loads may include the variation amount of the power consumption in addition to the information above.

For example, when the predictive value of the accumulated amount of power predicted based on the actual value of power measured by the grid power meter 310 exceeds the prescribed amount of power, the control unit 230 generates, in the first form, a list of loads in which power consumption should be reduced. On the other hand, when the predictive value of the accumulated amount of power predicted based on the variation amount of the power measured by the grid power meter 310 exceeds the prescribed amount of power, the control unit 230 generates, in the second form, a list of loads in which power consumption should be reduced.

The first form is a form in which a list of loads is presented in a descending order of the actual value of power acquired by the load power meter 340. The second form is a form in which a list of loads is presented in a descending order of the increment in power acquired by the load power meter 340.

Here, the control unit 230 generates the list so that frequency of replacement of the loads included in the list becomes low.

For example, the control unit 230 may generate a list which includes a prescribed number of loads listed in a descending order of power consumption or may generate a list which includes a prescribed number of loads listed in a descending order of an increment in power consumption among the loads connected to the grid.

Alternatively, the control unit 230 may generate a list in which a prescribed number of loads are highlighted in a descending order of power consumption among the loads connected to the grid, or may generate a list in which a prescribed number of loads are highlighted in a descending order of an increment in power consumption among the loads connected to the grid.

Alternatively, the update interval of the list in the first half (i.e., the first period) of the prescribed period may be longer than the update interval of the list in the second half (i.e., the second period) of the prescribed period.

The presentation unit 240 presents various types of information to the user. In particular, the presentation unit 240 is a display which displays each piece of information. However, the presentation unit 240 may be a speaker which outputs each piece of information as sound.

In the first embodiment, the presentation unit 240 presents the list of loads. Here, the presentation unit 240 may present a list of loads by using an application which acquires power consumption of the load 120 or a browser.

Figure 5:
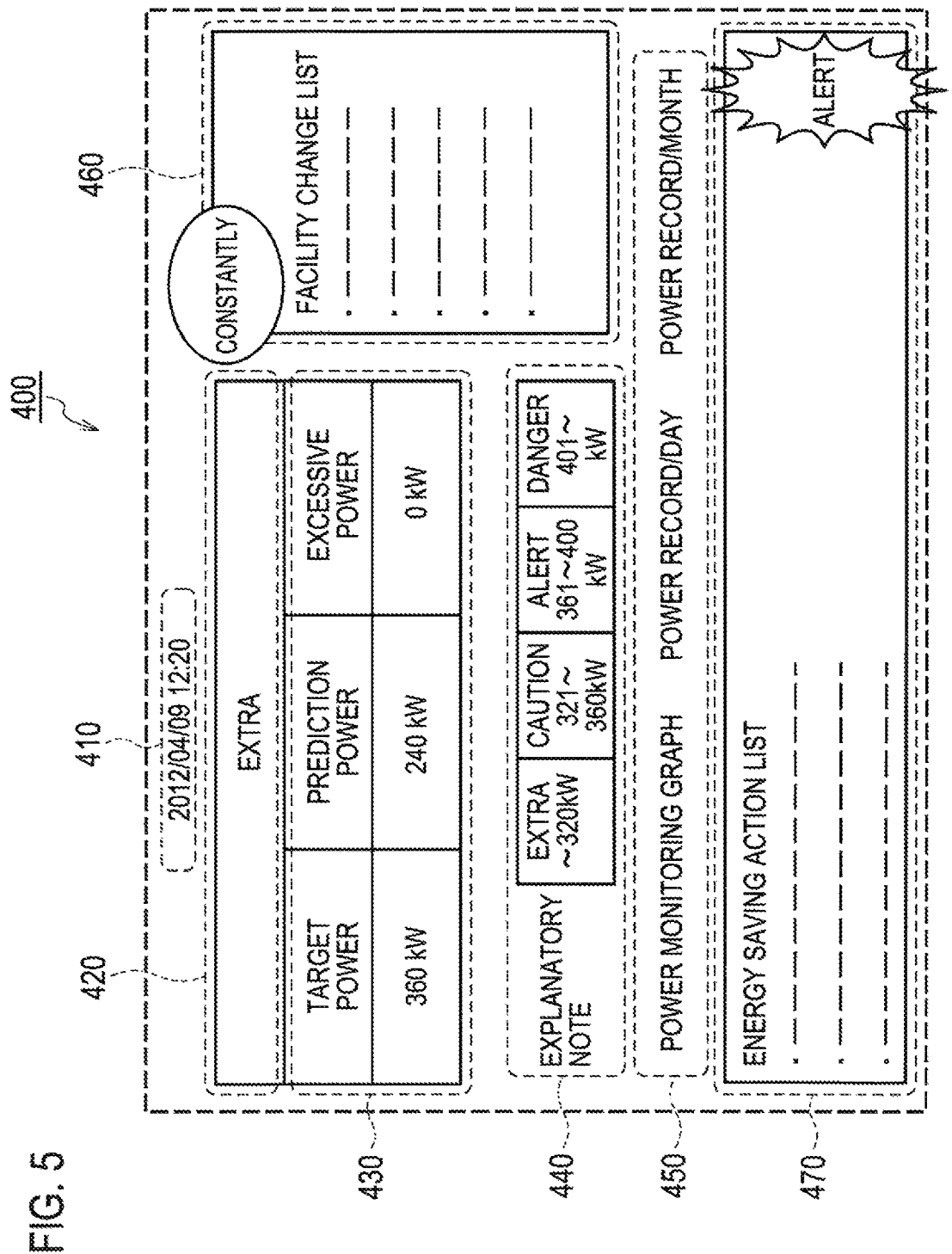
FIG. 5 is a diagram illustrating presentation information 400 according to the first embodiment.

In the first embodiment, the presentation unit 240 displays, for example, presentation information 400 as illustrated in FIG. 5. The presentation information 400 includes date and time information 410, state outline information 420, state detail information 430, state explanatory note information 440, link information 450, a facility change list 460 and an energy saving action list 470.

The date and time information 410 is information which indicates the present date and time.

The state outline information 420 is information which indicates an outline of a state of power supplied from the grid in the current prescribed period. The state outline information 420 is represented by, for example, four stages (extra, caution, alert and danger).

The state detail information 430 is information which indicates details of the state of power supplied from the grid in the current prescribed period. The state detail information 430 includes, for example, a target power value, a predictive power value and excessive power. The target power value is a target value of the accumulated amount of power supplied from the grid in the prescribed period. The predictive power value is a predictive value of the accumulated amount of power predicted by the power monitoring unit 330 described above. The excessive power is the amount of power in which the predictive power value exceeds the target power value. The unit of the power value is kWh.

The state explanatory note information 440 is information which indicates an explanatory note of the state outline information 420. The state explanatory note information 440 includes, for example, a threshold of each stage (extra, caution, alert and danger) and color expressing each stage and the like.

The link information 450 is information which indicates various types of information that can be switched from the presentation information 400 (i.e., a power monitoring graph, a power record/day and a power record/month). The "power monitoring graph" is, for example, a graph illustrated FIG. 6 described later. The "power record/day" and the "power record/month" are totaled results of past histories. By the selection (i.e., click) of the link information 450, the information presented by the presentation unit 240 is switched to the selected information.

The facility change list 460 is a list of loads which is presented constantly. The facility change list 460 includes, for example, the name of loads and power consumption of the loads.

Here, the facility change list 460 may be a list which includes a prescribed number of loads listed in a descending order of power consumption, or may be a list in which a prescribed number of loads are highlighted in a descending order of power consumption among the loads connected to the grid.

The energy saving action list 470 is a list of loads presented when the predictive value of the accumulated amount of power exceeds the prescribed amount of power. The energy saving action list 470 is an exemplary alert that indicates a list of loads in which power consumption should be reduced.

In the first embodiment, the energy saving action list 470 is presented in the first form or the second form. As described above, the first form is a form in which a list of loads is presented in a descending order of the actual value of power (i.e. sample value) acquired by the load power meter 340. The second form is a form in which a list of loads is presented in a descending order of the variation amount of the power (i.e. sample value) acquired by the load power meter 340.

Here, when the energy saving action list 470 is presented in the first form, the energy saving action list 470 may be a list which includes a prescribed number of loads listed in a descending order of power consumption, or may be a list in which a prescribed number of loads are highlighted in a descending order of power consumption among the loads connected to the grid. On the other hand, when the energy saving action list 470 is presented in the second form, the energy saving action list 470 may be a list which includes a prescribed number of loads listed in a descending order of an increment in power consumption among the loads connected to the grid, or may be a list in which a prescribed number of loads are highlighted in a descending order of an increment in power consumption among the loads connected to the grid.

(Normal Prediction Mode)

Figure 6:
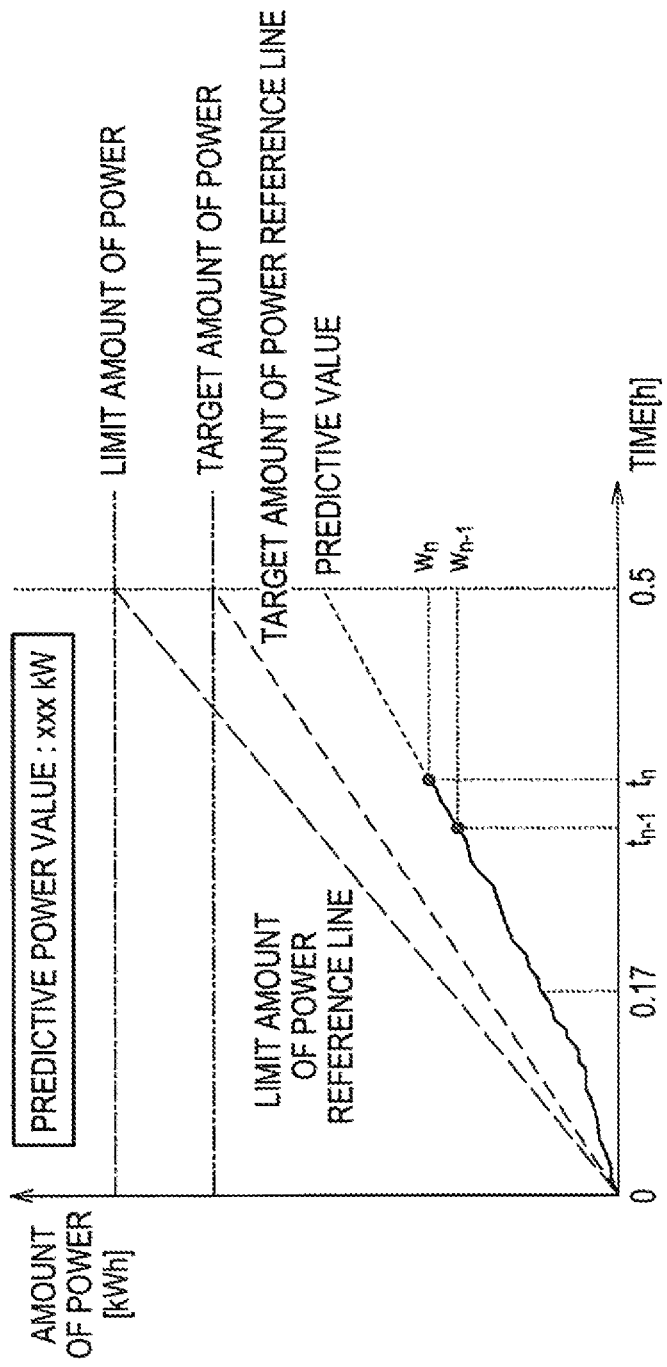
FIG. 6 is a diagram for describing a normal prediction mode according to the first embodiment.

Hereinafter, a normal prediction mode according to the first embodiment will be described. FIG. 6 is a diagram for describing a normal prediction mode according to the first embodiment. FIG. 6 is a diagram illustrating a power monitoring graph according to the first embodiment. In FIG. 6, a case in which the prescribed period is set to 30 minutes (i.e., 0.5 h) is illustrated. In the normal prediction mode, the accumulated amount of power is predicted using, for example, two sample values.

As illustrated in FIG. 6, at the present date included in the prescribed period, the power monitoring graph includes an integrated value of power (i.e., an accumulated amount of power) supplied from the grid. In detail, an actual value of the accumulated amount of power is illustrated by a solid line and a predictive value of the accumulated amount of power is illustrated by a dotted line.

The power monitoring graph includes a target amount of power and a limit amount of power as the prescribed amounts of power. The power monitoring graph may also include a target amount of power reference line which indicates a transition of the accumulated amount of power of which accumulated amount of power is set to be the target amount of power at the time of expiration of the prescribed period. The power monitoring graph may also include a limit amount of power reference line which indicates a transition of the accumulated amount of power of which accumulated amount of power is set to be the limit amount of power at the time of expiration of the prescribed period. The power monitoring graph may also include a predictive value of the accumulated amount of power (i.e., a predictive power value) at the time of expiration of the prescribed period.

Here, a case in which the accumulated amount of power at the time of expiration of the prescribed period is predicted at time $t_n$ will be described. The accumulated amount of power at time $t_n$ is $W_n$ and the accumulated amount of power at time $t_{n-1}$ is $W_{n-1}$.

In a case in which the accumulated amount of power is predicted based on the actual value, the predictive value of the accumulated amount of power is indicated by an approximation straight line of the actual value at each timing. The predictive value of the accumulated amount of power at the time of expiration of the prescribed period is expressed by "Y/X×0.5." Y/X is a slope of the approximation straight line.

That is, when "Y/X×0.5" exceeds the target amount of power (or the limit amount of power), the power monitoring unit 330 determines that the predictive value of the accumulated amount of power exceeds the prescribed amount of power. Alternatively, when "$W_n$" exceeds the target amount of power reference line (or the limit amount of power reference line), the power monitoring unit 330 may determine that the predictive value of the accumulated amount of power exceeds the prescribed amount of power.

In a case in which the accumulated amount of power is predicted based on the variation amount, the slope of the predictive value of the accumulated amount of power is expressed by "$(W_n-W_{n-1})/(t_n-t_{n-1})$." The predictive value of the accumulated amount of power at the time of expiration of the prescribed period is expressed by "$W_n+\{(W_n-W_{n-1})/(t_n-t_{n-1})\}\times(0.5-t_n)$."

That is, when "$W_n+\{(W_n-W_{n-1})/(t_n-t_{n-1})\}+(0.5-t_n)$" exceeds the target amount of power (or the limit amount of power), the power monitoring unit 330 determines that the predictive value of the accumulated amount of power exceeds the prescribed amount of power.

Here, the predictive power value is obtained based on the predictive value of the accumulated amount of power predicted by the power monitoring unit 330 described above. The unit of the predictive power value is kWh.

Figure 7:
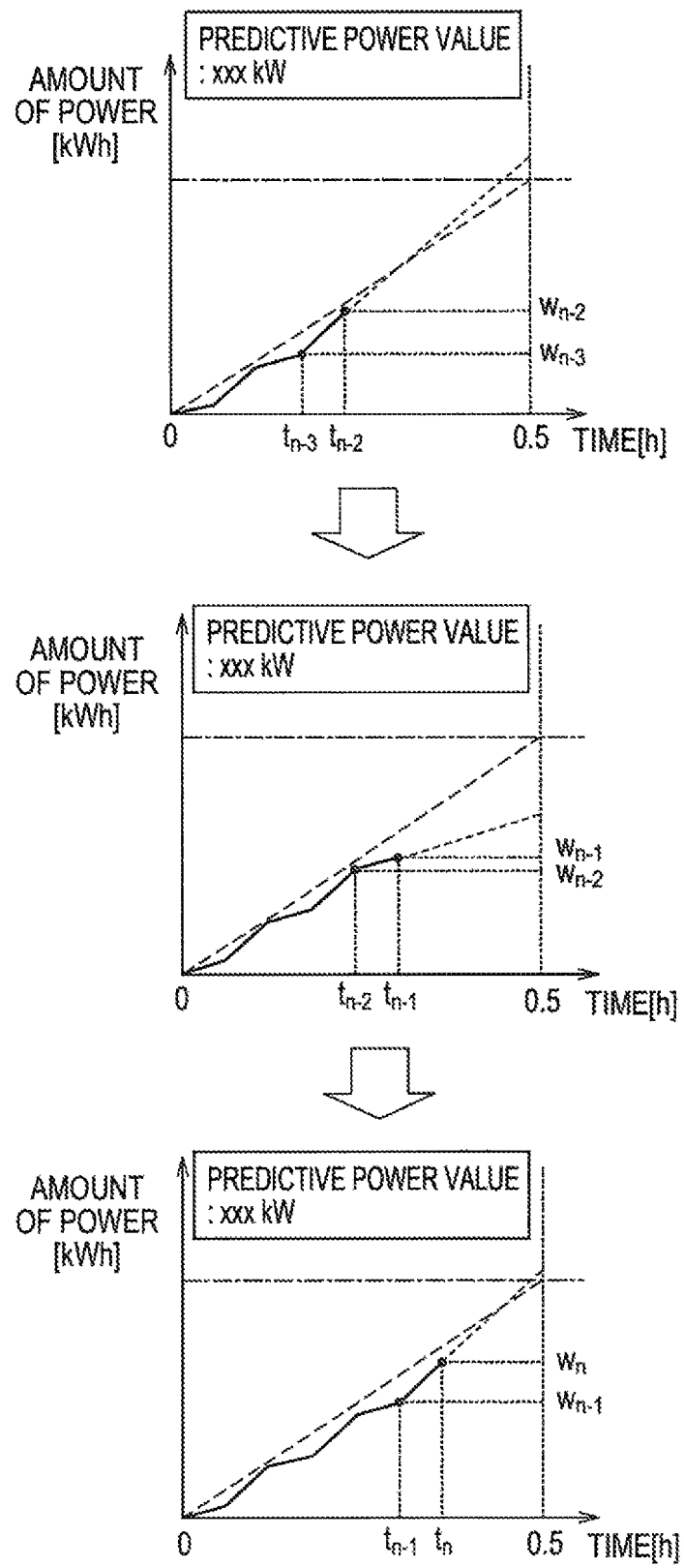
FIG. 7 is a diagram for describing the normal prediction mode according to the first embodiment.

In this manner, in the normal prediction mode, the variation of the power consumption of the load is reflected in real time on the predictive value of the accumulated amount of power at the time of expiration of the prescribed period. Therefore, when the variation of the power consumption of the load is large, the alert ON state and the alert OFF state are repeated as illustrated in FIG. 7. For example, in a case in which a fryer in, for example, a restaurant or a food counter in a commercial facility repeats turning on and off, switching between an alert ON state and an alert OFF state occurs frequently.

(Moderate Prediction Mode)

Figure 8:
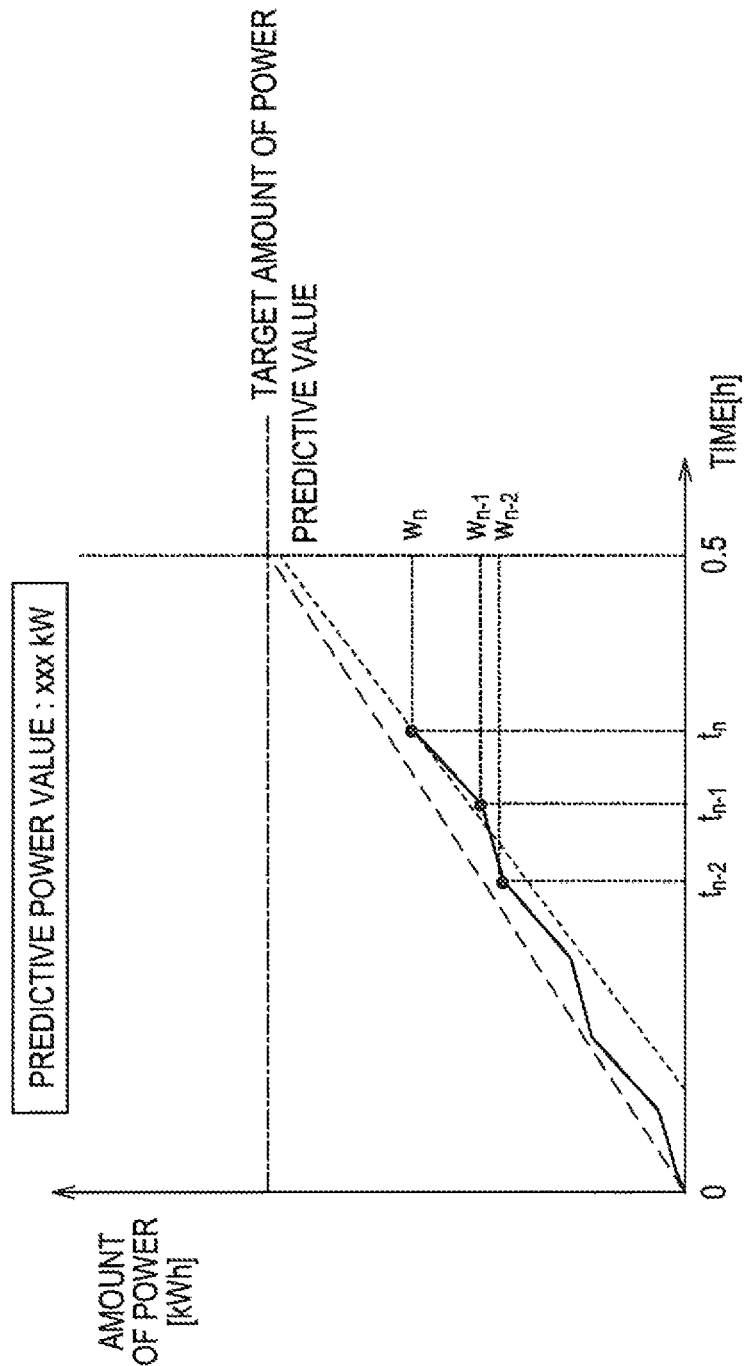
FIG. 8 is a diagram for describing a moderate prediction mode according to the first embodiment.

Hereinafter, a moderate prediction mode according to the first embodiment will be described. FIG. 8 is a diagram for describing the moderate prediction mode according to the first embodiment. Similarly to FIG. 6, FIG. 8 illustrates a power monitoring graph and illustrates a case in which the prescribed period is set to 30 minutes (i.e., 0.5 h). In the moderate prediction mode, the accumulated amount of power is predicted using, for example, three sample values.

As illustrated in FIG. 8, at the present date included in the prescribed period, the power monitoring graph includes an integrated value of power (i.e., an accumulated amount of power) supplied from the grid. In detail, an actual value of the accumulated amount of power is illustrated by a solid line and a predictive value of the accumulated amount of power is illustrated by a dotted line.

Here, a case in which the accumulated amount of power is predicted at time $t_n$ will be described. The accumulated amount of power at time $t_n$ is $W_n$, the accumulated amount of power at time $t_{n-1}$ is $W_{n-1}$ and the accumulated amount of power at time $t_{n-2}$ is $W_{n-2}$.

In such a case, a slope of the predictive value of the accumulated amount of power is defined in the following manner if the least-squares method is used. In particular, α in the following Expression (1) is defined so that the value of "J" expressed in the following Expression (2) becomes the minimum. α denotes the slope of the straight line indicating the predictive value of the accumulated amount of power.

$$f(t) = W_n + \alpha(t - t_n) \quad \text{[Expression 1]}$$

$$J = \sum_{i=n-2}^{n} (W_i - f(t_i))^2 \quad \text{[Expression 2]}$$

Therefore, the predictive value of the accumulated amount of power at the time of expiration of the prescribed period is expressed by "$W_n+\alpha\times(0.5-t_n)$."

That is, when "$W_n+\alpha\times(0.5-t_n)$" exceeds the target amount of power (or the limit amount of power), the power monitoring unit 330 determines that the predictive value of the accumulated amount of power exceeds the prescribed amount of power.

Figure 9:
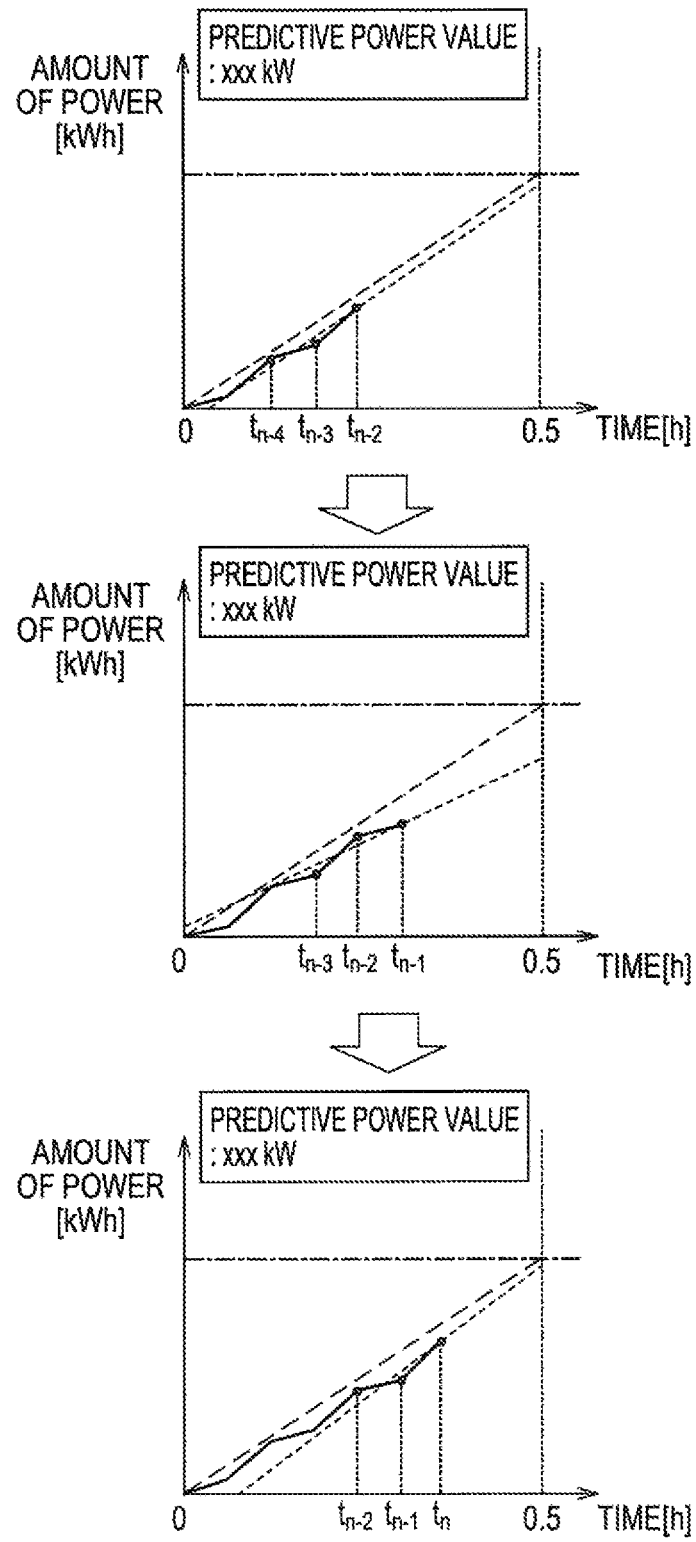
FIG. 9 is a diagram for describing the moderate prediction mode according to the first embodiment.

In this manner, in the moderate prediction mode, the variation of the power consumption of the load is moderately reflected on the predictive value of the accumulated amount of power at the time of expiration of the prescribed period. Therefore, even when the variation of the power consumption of the load is large, the alert ON state and the alert OFF state are not repeated as illustrated in FIG. 9. For example, in a case in which a fryer repeats turning on and off, frequent occurrence of switching between the alert ON state and the alert OFF state is reduced.

Here, as an example of the moderate prediction mode, a method for specifying the slope of the predictive value of the accumulated amount of power based on the least-squares method using three sample values has been described. However, in the moderate prediction mode, the slope of the predictive value of the accumulated amount of power may be specified based on the least-squares method using four or more sample values. Alternatively, in the moderate prediction mode, the slope of the straight line which expresses the predictive value of the accumulated amount of power based on the moving average method using three or more sample values may be specified. Alternatively, in the moderate prediction mode, the sample values may be acquired at longer intervals than in the normal prediction mode.

(Power Management Method)

Figure 10:
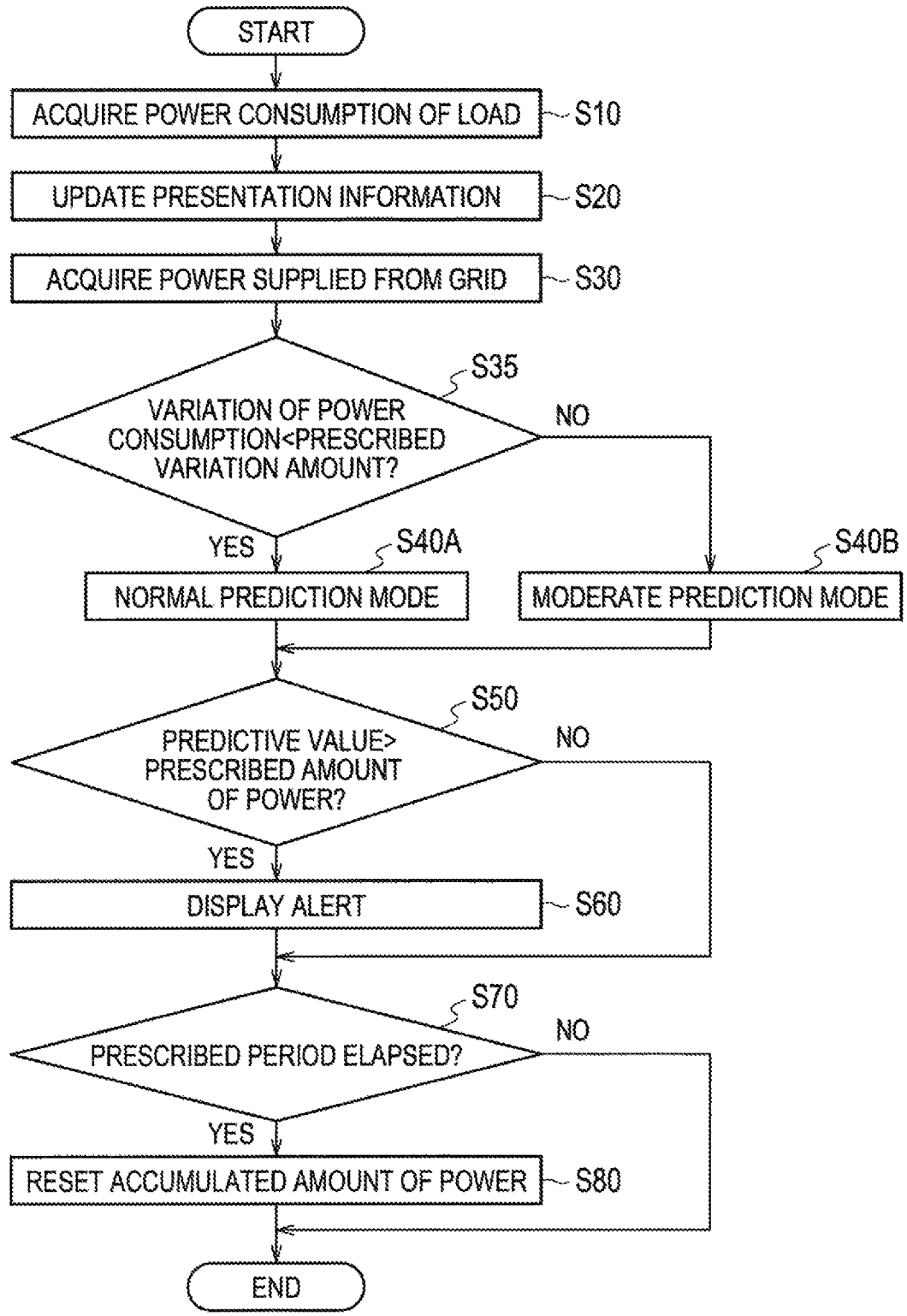
FIG. 10 is a flowchart illustrating a power management method according to the first embodiment.
Figures 11, 12:
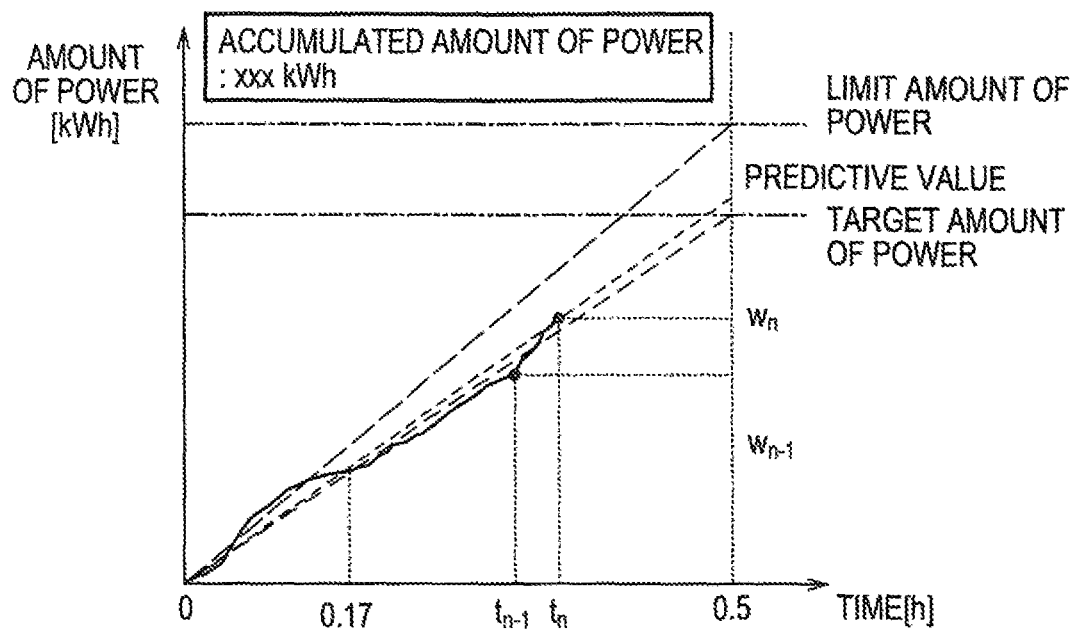
FIG. 11 is a diagram for describing a first form according to the first embodiment.
FIG. 12 is a diagram for describing the first form according to the first embodiment.
Figures 13, 14:
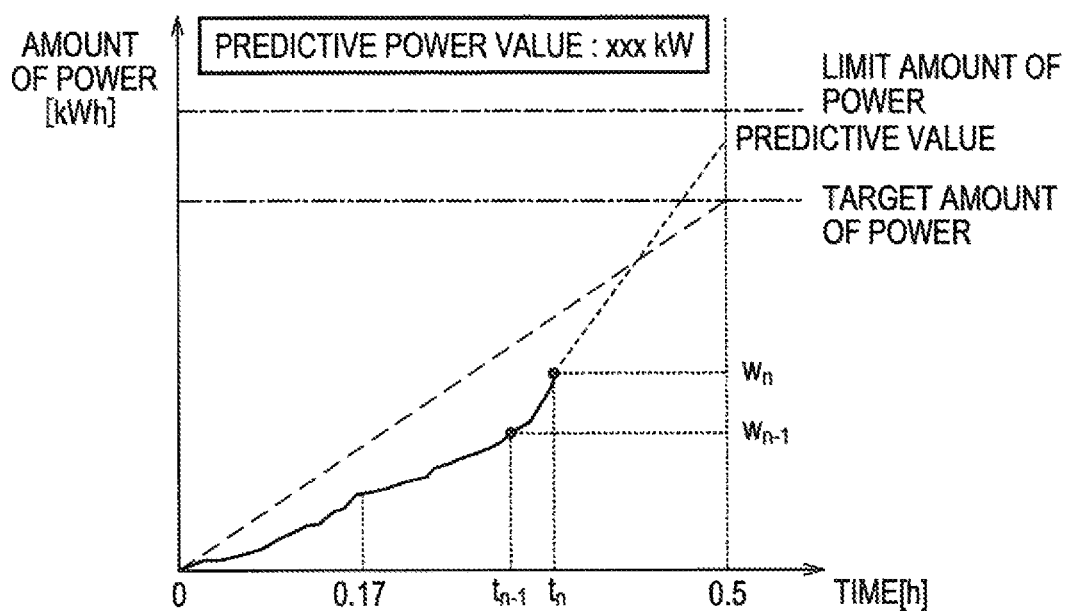
FIG. 13 is a diagram for describing a second form according to the first embodiment.
FIG. 14 is a diagram for describing the second form according to the first embodiment.

Hereinafter, the power management method according to the first embodiment will be described. FIG. 10 is a flowchart illustrating the power management method according to the first embodiment. FIGS. 11 and 12 are diagrams for describing a first form according to the first embodiment. FIGS. 13 and 14 are diagrams for describing a second form according to the first embodiment.

The flowchart illustrated in FIG. 10 is performed at an update interval (for example, 1 minute) of a list. Here, it is desirable that the update interval of the list in a first half (i.e., a first period) of the prescribed period (for example, 5 minutes) is longer than the update interval of the list in a second half (i.e., a second period) of the prescribed period (for example, 1 minute). Alternatively, the update interval of the list may be shortened as the time approaches the expiration of the prescribed period.

As illustrated in FIG. 10, in step S10, each load power meter 340 measures power consumed in the load 120. The smart sensor 350 collects power measured by the load power meter 340 provided under the control of the smart sensor 350. The EMS 200 acquires, from the smart sensor 350, information which indicates the power measured by each load power meter 340.

In step S20, the EMS 200 updates information presented by the presentation unit 240. In particular, the EMS 200 updates information (here, facility change list 460) presented by the presentation unit 240 based on the power measured by each load power meter 340.

In step S30, the grid power meter 310 measures the power supplied from the distribution line 31 (i.e., the grid). The power measurement unit 320 integrates the power measured by the grid power meter 310 in the prescribed period (for example, 30 minutes). The power monitoring unit 330 acquires the integrated value (i.e., the accumulated amount of power) from the power measurement unit 320.

In step S35, the power measurement unit 320 determines whether the variation of the power consumption of the load connected to the grid is smaller than the prescribed variation amount. When the variation of the power consumption is smaller than the prescribed variation amount, a process in step S40A is performed (YES). On the other hand, when the variation of the power consumption is greater than the prescribed variation amount, a process in step S40B is performed (NO).

In step S40A, the power monitoring unit 330 applies the normal prediction mode and predicts the predictive value of the accumulated amount of power at the time of expiration of the prescribed period based on the integrated value (i.e., the accumulated amount of power) acquired from the power measurement unit 320.

In step S40B, the power monitoring unit 330 applies the moderate prediction mode predicts the predictive value of the accumulated amount of power at the time of expiration of the prescribed period based on the integrated value (i.e., the accumulated amount of power) acquired from the power measurement unit 320.

That is, the power monitoring unit 330 predicts the predictive value of the accumulated amount of power at the time of expiration of the prescribed period using a greater number of sample values than in the normal prediction mode. Alternatively, the power monitoring unit 330 predicts the predictive value of the accumulated amount of power at the time of expiration of the prescribed period using the sample values acquired at the longer intervals than in the normal prediction mode.

In step S50, the power monitoring unit 330 determines whether the predictive value of the accumulated amount of power has exceeded the prescribed power (i.e., the target amount of power or the limit amount of power). If the determination result is "YES," a process in step S60 is performed. If the determination result is "NO," a process in step S70 is performed.

In step S60, the EMS 200 updates the information presented by the presentation unit 240. In particular, the EMS 200 updates the information presented by the presentation unit 240 (here, the energy saving action list 470) based on the predictive value of the accumulated amount of power (that is, the power measured by the grid power meter 310).

In particular, when the predictive value of the accumulated amount of power predicted based on the actual value of power (i.e., the sample value) acquired by the grid power meter 310 exceeds the prescribed amount of power, the EMS 200 presents, in the first form, a list of the loads in which power consumption to be reduced. As illustrated in FIG. 11, when "Y/X×0.5" exceeds the target amount of power (or the limit amount of power), a list of loads is presented, as an energy saving action list 470, in a descending order of actual values of power (i.e., sample values) acquired by the load power meter 340 as illustrated in FIG. 12. For example, in the first half (i.e., the first period) of the prescribed period, the EMS 200 presents, as an energy saving action list 470, the list of loads in a descending order of actual values of power acquired by the load power meter 340.

On the other hand, when the predictive value of the accumulated amount of power predicted based on the variation amount of the power (i.e., the sample value) acquired by the grid power meter 310 exceeds the prescribed amount of power, the EMS 200 presents, in the second form, the list of loads in which power consumption to be reduced. As illustrated in FIG. 13, when "$W_n + \{(W_n - W_{n-1})/(t_n - t_{n-1})\} \times (0.5 - t_n)$" exceeds the target amount of power (or the limit amount of power), a list of loads is presented, as the energy saving action list 470, in a descending order of increments in power (i.e., the sample values) acquired by the load power meter 340 as illustrated in FIG. 14. For example, in the second half (i.e., the second period) of the prescribed period, the EMS 200 presents, as an energy saving action list 470, the list of loads in a descending order of the increments in power acquired by the load power meter 340.

In step S70, the power measurement unit 320 determines whether the prescribed period has elapsed. If the determination result is "YES," a process in step S80 is performed. If the determination result is "NO," a series of processes are completed.

In step S80, the power measurement unit 320 resets the integrated value of power (i.e., the accumulated amount of power) measured by the grid power meter 310.

As described above, in the first embodiment, the power management apparatus (i.e., the power monitoring unit 330) changes the number of sample values used for the prediction of the accumulated amount of power or the intervals at which the sample values used for the prediction of the accumulated amount of power are acquired. By properly controlling the number of sample values or the intervals at which the sample values are acquired, repetition of the alert ON state and the alert OFF state is reduced. For example, even in a case in which turning on and off of a fryer is repeated, frequent occurrence of switching between the alert ON state and the alert OFF state is reduced.

In the first embodiment, when the predictive value of the accumulated amount of power predicted based on the actual value of power (i.e., sample value) acquired by the grid power meter 310 or the predictive value of the accumulated amount of power predicted based on the variation amount of the power (i.e., sample value) acquired by the grid power meter 310 reaches the prescribed amount of power, the power management apparatus (i.e., the EMS 200) presents an alert that indicates a list of loads in which power consumption should be reduced. That is, the power management apparatus (i.e., the power monitoring unit 330) uses the method for predicting the accumulated amount of power at the time of expiration of the prescribed period properly. This reduces repetition of an alert ON state and an alert OFF state.

For example, in the first half (i.e., the first period) of the prescribed period, the power management apparatus (i.e., the power monitoring unit 330) predicts the accumulated amount of power at the time of expiration of the prescribed period based on the actual value of power acquired by the grid power meter 310. Therefore, repetition of the alert ON state and the alert OFF state due to instantaneous increase and decrease in power consumption does not occur.

On the other hand, in the second half (i.e., the second period) of the prescribed period, the power management apparatus (i.e., the power monitoring unit 330) predicts the accumulated amount of power at the time of expiration of prescribed period based on the variation amount of the power acquired by the grid power meter 310. Therefore, it is possible to accurately determine whether the predictive value of the accumulated amount of power at the time of expiration of the prescribed period exceeds the prescribed amount of power.

In the first embodiment, when the predictive value of the accumulated amount of power predicted based on the actual value of power acquired by the grid power meter 310 exceeds the prescribed amount of power, the power management apparatus (i.e., the EMS 200) presents, as the energy saving action list 470, the list of loads in a descending order of the actual value of power acquired by the load power meter 340 (the first form). Therefore, the load in which power consumption should be reduced can be presented to the user properly.

On the other hand, when the predictive value of the accumulated amount of power predicted based on the variation amount of the power acquired by the grid power meter 310 exceeds the prescribed amount of power, the power management apparatus (i.e., the EMS 200) presents, as the energy saving action list 470, the list of loads in a descending order of the variation amount of the power acquired by the load power meter 340 (the second form). Therefore, the load in which power consumption should be reduced can be presented to the user properly.

In the first embodiment, the power management apparatus (i.e., the EMS 200) presents the list so that frequency of replacement of the loads included in the list becomes low. Therefore, a user can effectively know a load in which power consumption should be reduced while suppressing confusion of the user.

For example, the power management apparatus (i.e., the EMS 200) presents a list which includes a prescribed number of loads listed in a descending order of power consumption or presents a list which includes a prescribed number of loads listed in a descending order of an increment in power consumption among the loads connected to the grid. In this manner, frequency of replacement of the loads included in the list becomes low.

Alternatively, the power management apparatus (i.e., the EMS 200) may present a list in which a prescribed number of loads are highlighted in a descending order of power consumption among the loads connected to the grid, or may present a list in which a prescribed number of loads are highlighted in a descending order of increments in power consumption among the loads connected to the grid. In this manner, frequency of replacement of the highlighted loads included in the list becomes low.

Alternatively, the update interval of the list in the first half (i.e., the first period) of the prescribed period may be longer than the update interval of the list in the second half (i.e., the second period) of the prescribed period. Therefore, in a period with low urgency to reduce power consumption (i.e., the first period), confusion of a user can be reduced. On the other hand, in a period with high urgency to reduce power consumption (i.e., the second period), the user can effectively know the load in which power consumption to be reduced.

[Modification 1]

Hereinafter, Modification 1 of the first embodiment will be described. Hereinafter, differences between the first embodiment and Modification 1 will be mainly described.

In particular, in the first embodiment, the interval at which the power consumed by the load 120 is acquired and the update interval of the list are the same. In contrast, in Modification 1, the interval at which the power consumed by load 120 is acquired differs from the update interval of the list.

For example, the interval at which the power consumed by the load 120 is acquired may be 1 minute and the update interval of the list may be a prescribed time interval (for example, 5 minutes). The update interval of the list may be variable similarly to the first embodiment.

(Power Management Method)

Hereinafter, a power management method according to Modification 1 will be described. FIG. 15 is a flowchart illustrating a power management method according to Modification 1. In FIG. 15, step S15 is added between step S10 and step S20 to the flowchart illustrated in FIG. 10.

In step S15, the EMS 200 determines whether a prescribed time interval has elapsed. If the determination result is "YES," a process in step S20 is performed. If the determination result is "NO," a process in step S30 is performed.

In this manner, if the prescribed time interval (i.e., the update interval of the list) is longer than the interval at which the power consumed by the load 120 is acquired, confusion of the user due to frequent updating of the list can be reduced.

[Modification 2]

Hereinafter, Modification 2 of the first embodiment will be described. Hereinafter, differences between the first embodiment and Modification 2 will be mainly described.

In the first embodiment, the power monitoring unit 330 determines whether the variation of the power consumption of the load connected to the grid is greater than the prescribed variation amount based on the kind of the load connected to the grid. In contrast, in Modification 2, whether the variation of the power consumption of the load connected to the grid is greater than the prescribed variation amount is determined based on the power measured by each load power meter 340.

In Modification 2, it should be noted that the subject which determines whether the predictive value of the accumulated amount of power has exceeded the prescribed amount of power at the time of expiration of the prescribed period is the EMS 200. The EMS 200 receives, as the sample value, information which indicates the accumulated amount of power at each timing from the power monitoring unit 330. Similarly to the power monitoring unit 330 described in the first embodiment, the EMS 200 predicts the accumulated amount of power at the time of expiration of the prescribed period and determines whether the predictive value of the accumulated amount of power has exceeded the prescribed amount of power.

[Modification 3]

Hereinafter, Modification 3 of the first embodiment will be described. Hereinafter, differences between the first embodiment and Modification 3 will be mainly described.

In particular, in Modification 3, the EMS 200 suspends the presentation of the energy saving action list 470 until a predetermined period (for example, 10 minutes) elapses since the start of the prescribed period (for example, 30 minutes). Therefore, in a state in which predictive accuracy in the accumulated amount of power at the time of expiration of the prescribed period is low, repetition of the alert ON state and the alert OFF state is reduced.

[Modification 4]

Hereinafter, Modification 4 of the first embodiment will be described. Hereinafter, differences between the first embodiment and Modification 4 will be mainly described.

In particular, in Modification 4, the power measurement unit 320 may continuously manage the integrated value of power measured by the grid power meter 310 without resetting, in each prescribed period, the integrated value of power (i.e., the accumulated amount of power) measured by the grid power meter 310. That is, the power measurement unit 320 predicts the accumulated amount of power at the time of expiration of the current prescribed period based on power measured by the grid power meter 310 in the period before the current prescribed period in addition to the current prescribed period. Therefore, immediately after the start of the current prescribed period, a decrease in predictive accuracy in the accumulated amount of power at the time of expiration of the current prescribed period is reduced.

However, it is needless to mention that the information presented by the EMS 200 (for example, the presentation information 400 and the power monitoring graph) is reset in each prescribed period.

Other Embodiment

Although the present invention has been described with reference to the embodiment described above, it should not be understood that the discussion and drawings constituting a part of the disclosure are limiting the present invention. Various alternative embodiments, examples and operation technology will be apparent to a person skilled in the art from the present disclosure.

In the embodiment, the power management apparatus is configured by the EMS 200 and the power monitoring unit 330. However, the embodiment is not limited to the same. The function of the power monitoring unit 330 may be provided in the EMS 200. Alternatively, the alert presentation apparatus may be provided in the CEMS 20 or provided in the smart server 40.

Here, the EMS 200 may be a HEMS (Home Energy Management System), a BEMS (Building Energy Management System), an FEMS (Factory Energy Management System) or a SEMS (Store Energy Management System).

Although not especially mentioned in the embodiment, the load power meter 340 may be a current sensor or the like.

In the embodiment, the consumer facility 10 is provided with the load 120, the PV unit 130, the storage battery unit 140, the fuel cell unit 150 and the hot water storage unit 160. However, it is only necessary that the consumer facility 10 should be provided at least with the load 120.

In the embodiment, a is defined so that the value of "J" becomes the minimum in the least-squares method. Here, the value of "J" may be expressed by Expression (3).

$$J = \sum_{i=n-2}^{n} (W_i - f(t_i))^2 \quad \text{[Expression 3]}$$

$$= (w_{n-2} - f(t_{n-2}))^2 + (w_{n-1} - f(t_{n-1}))^2 + (w_n - f(t_n))^2$$

$$= (w_{n-2} - f(t_{n-2}))^2 + (w_{n-1} - f(t_{n-1}))^2 + 0$$

$$= \sum_{i=1}^{2} (W_{n-i} - f(t_{n-i}))^2$$

In order to minimize sum of squares of errors, a weighted sequence of numbers $a_i$ may be used and the value of "J" may be calculated in accordance with Expression (4).

$$J = \sum_{i=1}^{2} a_i(W_{n-i} - f(t_{n-i}))^2 \quad \text{[Expression 4]}$$

Here, the value of the weighted sequence of numbers $a_i$ may be stored as a predetermined table. Alternatively, the value of the weighted sequence of numbers $a_i$ may be expressed by "1/i" ($a_i$=1, ½, ⅓, . . . ). Alternatively, the value of the weighted sequence of numbers $a_i$ may be expressed by "1–/i²." Alternatively, the value of the weighted sequence of numbers $a_i$ may be expressed by "1/i–0.1."

In order to minimize the sum of the error absolute values, the value of "J" may be calculated as Expression (5) or Expression (6).

$$J = \sum_{i=1}^{2} |(W_{n-i} - f(t_{n-i}))^2| \quad \text{[Expression 5]}$$

$$J = \sum_{i=1}^{2} |a_i(W_{n-i} - f(t_{n-i}))^2| \quad \text{[Expression 6]}$$

In the embodiment, the list of loads is configured so as to include power consumption for each load. However, the embodiment is not limited to the same. The list of loads may be configured so as to include power consumption for each group of loads connected to the power line provided under the control of a breaker of the distribution board 110. In such a case, it is desirable that the smart sensor 350 transmits, to the EMS 200, information which indicates the total value of power measured by a plurality of load power meters 340 together with an identifier of the smart sensor 350.

Although not especially mentioned in the embodiment, the predictive value of the accumulated amount of power may be corrected based on the PV power generation prediction information. For example, when the amount of generated power of the PV 131 tends to increase, the predictive value of the accumulated amount of power may be revised downward. Alternatively, the predictive value of the accumulated amount of power may be corrected based on the power generation extra capacity of the fuel cell 151 (i.e., a value excluding the current amount of generated power from the maximum amount of generated power). For example, the predictive value of the accumulated amount of power may be revised downward as the power generation extra capacity of the fuel cell 151 is larger. Alternatively, the predictive value of the accumulated amount of power may be corrected based on a remaining amount of stored power of the fuel cell 151. For example, the predictive value of the accumulated amount of power may be revised downward as the remaining amount of stored power of the fuel cell 151 is larger.

Although not especially mentioned in the embodiment, the presentation information 400 may include PV power generation prediction information. Alternatively, the presentation information 400 may include information which indicates power generation extra capacity of the fuel cell 151. Alternatively, the presentation information 400 may include the remaining amount of stored power of the fuel cell 151.

Although not especially mentioned in the embodiment, it is desirable that the EMS 200 controls the PV unit 130, the storage battery unit 140, the fuel cell unit 150 and the hot water storage unit 160 so that the accumulated amount of power at the time of expiration of the prescribed period does not exceed the prescribed amount of power.

Although not especially mentioned in the embodiment, in Japan, for example, the basic rate in the total power rate of a high-voltage power user is defined based, for example, on the amount of power in the past demand period (for example, 30 minutes). That is, the amount of power (i.e., usage amount of power) for 30 minutes is measured by the grid power meter 310. Then average power usage in the 30 minutes (kW) is calculated. The average power usage is referred to as a 30-minute demand value. Further the largest 30-minute demand value in one month is referred to as the maximum demand power (i.e., the maximum demand value) of the month. Then, the largest value in the maximum demand value of the month or the maximum demand value in the past one year is used for calculation of the basic rate. That is, if once a large demand value is caused in one month or one year, the basic rate using the demand value will be applied to the next month or to the next year. The basic rate is defined in this manner.

As described above, as for the present invention, it is needless to mention that various embodiments that are not described here are included. Moreover, it is also possible to combine the above-described embodiments and modifications. Accordingly, the technical range of the present invention is to be defined only by the inventive specific matter according to the adequate claims from the above description.

It is noted that the entire content of Japan Patent Application No. 2012-112907 (filed on May 16, 2012) and Japan Patent Application No. 2012-122552 (filed on May 29, 2012) are incorporated in the present application by reference.

INDUSTRIAL APPLICABILITY

According to the present invention, it is possible to provide a power management apparatus, a power management system and a power management method capable of letting a user effectively know a load in which power consumption to be reduced while reducing confusion of the user.

The invention claimed is:

1. A power management apparatus which issues an alert to a user so that an accumulated amount of power supplied from a grid in a prescribed period does not exceed a prescribed amount of power, comprising:
  a first power acquisition unit which acquires information indicating power supplied from the grid;
  a second power acquisition unit which acquires information indicating power consumed by each of a plurality of loads connected to the grid;
  a prediction unit which predicts an accumulated amount of power based on an actual value or a variation amount of the information, indicating the power supplied from the grid, acquired by the first power acquisition unit; and
  a presentation unit which, when the predicted accumulated amount of power reaches a prescribed amount of power, issues an alert that indicates a list of two or more of the plurality of loads for which power consumption may be reduced, wherein the list is prioritized based on the information acquired by the second power acquisition unit for each of the two or more loads.

2. The power management apparatus according to claim 1,
  wherein the prescribed period includes a first period and a second period,
  wherein, during the first period, the prediction of an accumulated amount of power is based on the actual value of power supplied from the grid, and
  wherein, during the second period, the prediction of an accumulated amount of power is based on the variation amount of the information indicating the power supplied from the grid.

3. The power management apparatus according to claim 2,
  wherein the presentation of the list comprises a first form when the predicted accumulated amount of power is based on the actual value of power supplied from the grid, and
  wherein the presentation of the list comprises a second form which is different from the first form when the predicted accumulated amount of power is based on the variation amount of the information indicating the power supplied from the grid.

4. The power management apparatus according to claim 3, wherein the first form is a form in which the two or more loads, for which power consumption may be reduced, are presented in a descending order of actual values of power acquired by the second power acquisition unit.

5. The power management apparatus according to claim 3, wherein the second form is a form in which the two or more loads, for which power consumption may be reduced, are presented in a descending order of a variation amount of the information, indicating power consumed by the load, acquired by the second power acquisition unit.

6. The power management apparatus according to claim 1, wherein the power management apparatus predicts an accumulated amount of power supplied from the grid in the prescribed period.

7. The power management apparatus according to claim 6, wherein the prediction unit:
  acquires, as sample values, an amount of power acquired by the first power acquisition unit
  predicts the accumulated amount of power based on the acquired sample values; and
  changes a number of the sample values or intervals at which the sample values are acquired.

8. The power management apparatus according to claim 7, wherein the prediction unit changes the number of the sample values or the intervals at which the sample values are acquired, based on a kind of one or more of the plurality of loads connected to the grid.

9. The power management apparatus according to claim 7, wherein the prediction unit changes the number of the sample values or the intervals at which the sample values are acquired, based on a variation of the information acquired by the second power acquisition unit.

10. The power management apparatus according to claim 7, wherein the prediction unit predicts the accumulated amount of power, using three or more sample values as the sample values, and specifies a slope which indicates a change in the accumulated amount of power based on a least-squares method or a moving average method.

11. A power management system provided with a power management apparatus and a plurality of loads connected to a grid, the power management apparatus comprising:
   a first power acquisition unit which acquires information indicating power supplied from the grid;
   a second power acquisition unit which acquires information indicating power consumed by each of a plurality of loads connected to the grid;
   a prediction unit which predicts an accumulated amount of power based on an actual value or a variation amount of the information, indicating the power supplied from the grid, acquired by the first power acquisition unit; and
   a presentation unit which, when the predicted accumulated amount of power reaches a prescribed amount of power, presents an alert that indicates a list of two or more of the plurality of loads for which power consumption may be reduced, wherein the list is prioritized based on the information acquired by the second power acquisition unit for each of the two or more loads.

12. A power management method which presents an alert to a user so that an accumulated amount of power supplied from a grid in a prescribed period does not exceed a prescribed amount of power, the power management method comprising:
   acquiring first information indicating power supplied from the grid;
   acquiring second information indicating power consumed by each of a plurality of loads connected to the grid;
   predicting an accumulated amount of power based on an actual value of power or a variation amount of the first information; and,
   when the predicted accumulated amount of power reaches a prescribed amount of power, presenting an alert that indicates a list of two or more of the plurality of loads for which power consumption may be reduced, wherein the list is prioritized based on the second information for each of the two or more loads.

* * * * *